United States Patent

Hurter et al.

Patent Number: 5,928,386
Date of Patent: Jul. 27, 1999

[54] PROCESS FOR TRICHROMATIC DYEING OR PRINTING

[75] Inventors: Rudolf Hurter, Basel, Switzerland; Jean-Marie Adam, Rosenau; Francine Casi, Eschentzwiller, both of France

[73] Assignee: Ciba Specialty Chemicals Corporation, Tarrytown, N.Y.

[21] Appl. No.: 08/861,288

[22] Filed: May 21, 1997

[30] Foreign Application Priority Data

May 21, 1996 [CH] Switzerland ............................ 1274/96

[51] Int. Cl.⁶ ................................ D06P 3/04; D06P 3/10; D06P 3/06; C09B 7/22
[52] U.S. Cl. .......................... 8/549; 8/641; 8/662; 8/687; 8/917; 8/918; 8/924; 8/925
[58] Field of Search ........................ 8/549, 641, 917–925

[56] References Cited

U.S. PATENT DOCUMENTS

| | | | |
|---|---|---|---|
| 4,009,156 | 2/1977 | Kramb | 260/169 |
| 4,185,959 | 1/1980 | Imada et al. | |
| 4,591,634 | 5/1986 | Herd et al. | 534/570 |
| 4,652,269 | 3/1987 | Bowles et al. | 8/641 |
| 5,456,727 | 10/1995 | Heimling et al. | 8/549 |
| 5,496,381 | 3/1996 | Russ et al. | 8/549 |
| 5,644,040 | 7/1997 | Hurter | 534/635 |

FOREIGN PATENT DOCUMENTS 0714955  6/1996  European Pat. Off. .

OTHER PUBLICATIONS

Chem. Abstr. 108:152086u of JP 62250059 Oct. 1987.
Derwent Abst. 86–262049/40 of JP–A–61,190,561 Aug. 1986.
Chem Abst. 106:019974z of JP 61,190,561 Aug. 1986.

Primary Examiner—Margaret Einsmann
Attorney, Agent, or Firm—Jacob M. Levine; David R. Crichton

[57] ABSTRACT

A process for dyeing or printing natural or synthetic polyamide fiber material by the trichromatic technique, which comprises using at least one blue-dyeing dye of formula

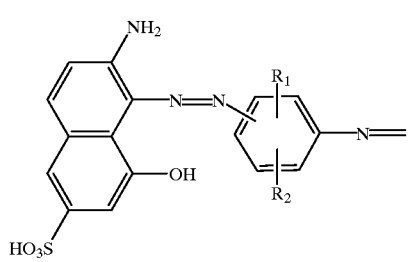

(1)

-continued

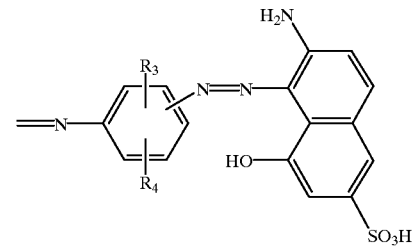

or

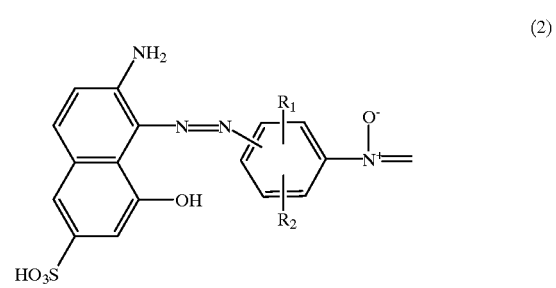

(2)

together with at least one red-dyeing dye of formula

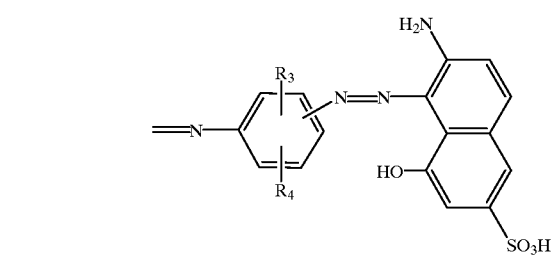

(3)

together with at least one yellow- or orange-dyeing dye of formula

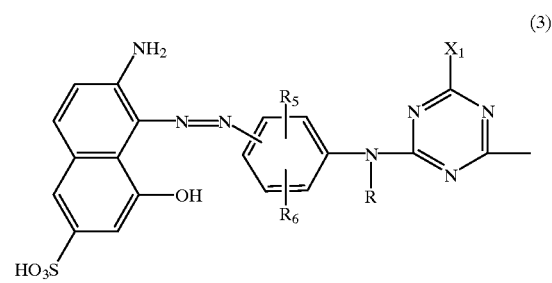

and

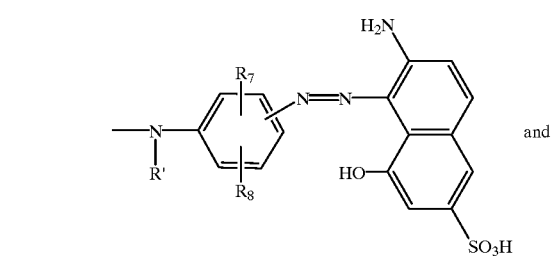

-continued
(4)
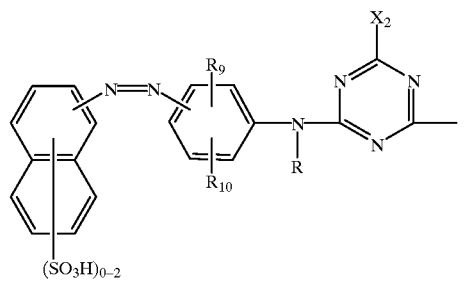
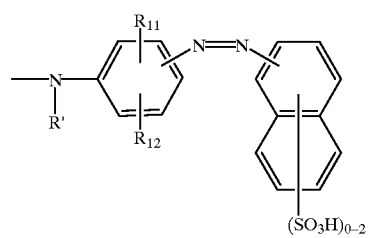
or
(5)
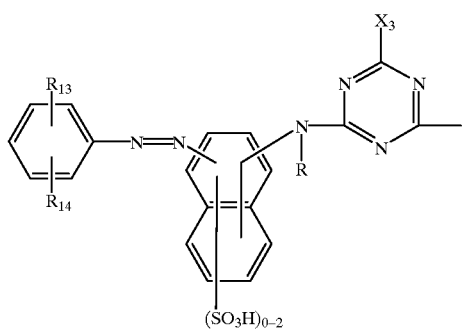
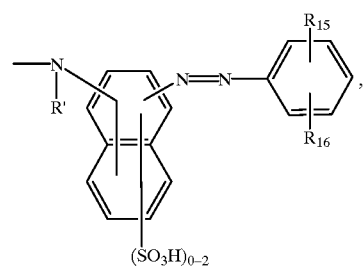
13 Claims, No Drawings

PROCESS FOR TRICHROMATIC DYEING OR PRINTING

PROCESS FOR TRICHROMATIC DYEING OR PRINTING

The present invention relates to a process for dyeing or printing natural or synthetic polyamide fibre materials by the trichromatic technique.

It is the object of this invention to provide a process for dyeing or printing natural or synthetic polyamide fibre materials with dyes suitable for combination dyeing by the trichromatic technique.

It has now been found that this object can be achieved by the inventive process described hereinafter. The dyeings so obtained meet the above requirements and are distinguished in particular by level colour build-up while at the same time having consistency of shade at different concentrations as well as good compatibility.

The invention relates to a process for dyeing or printing natural or synthetic polyamide fibre material by the trichromatic technique, which comprises using at least one blue-dyeing dye of formula (1) or (2)

wherein R and R' are each independently of the other hydrogen or unsubstituted or substituted $C_1$–$C_4$alkyl, $R_5$, $R_6$, $R_7$ and $R_8$ are each independently of one another hydrogen, $C_1$–$C_4$alkyl, $C_1$–$C_4$alkoxy, $C_2$–$C_4$alkanoylamino, ureido, halogen or sulfo, and $X_1$ is halogen, and together with at least one yellow- or orange-dyeing dye of formula (4) or (5)

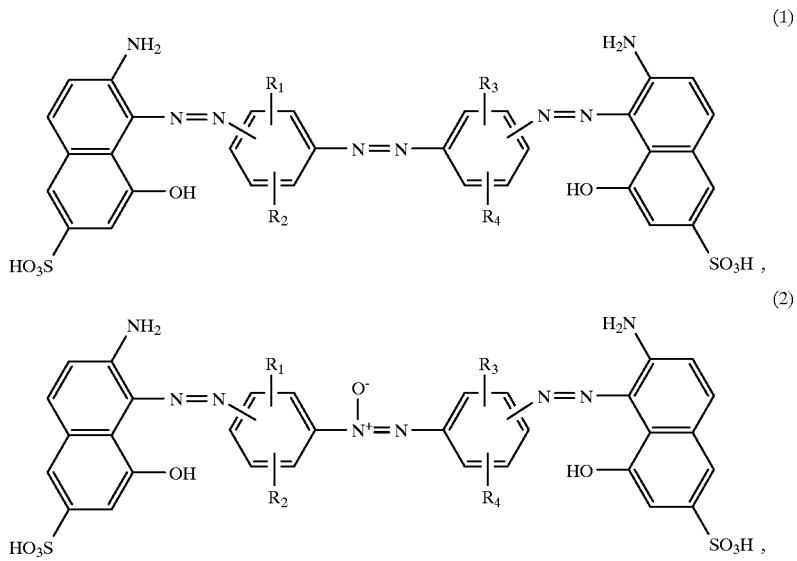

wherein $R_1$, $R_2$, $R_3$ and $R_4$ are each independently of one another hydrogen, $C_1$–$C_4$alkyl, $C_1$–$C_4$alkoxy, $C_2$–$C_4$alkanoylamino, ureido, halogen or sulfo, together with at least one red-dyeing dye of formula (3)

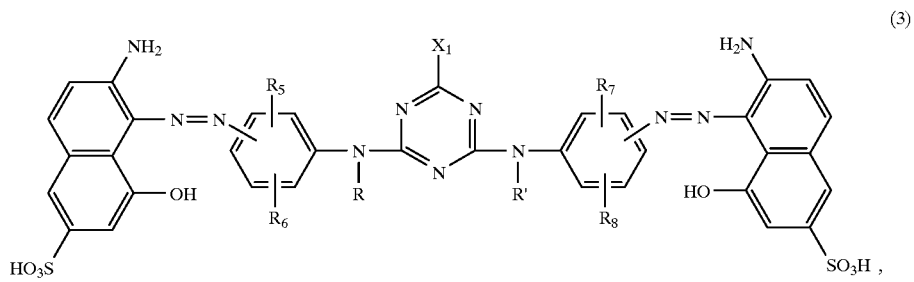

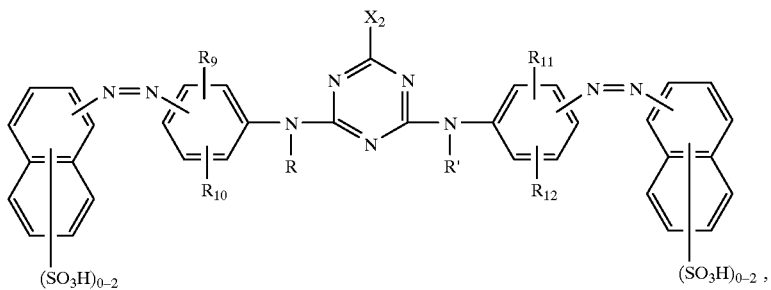

(4)

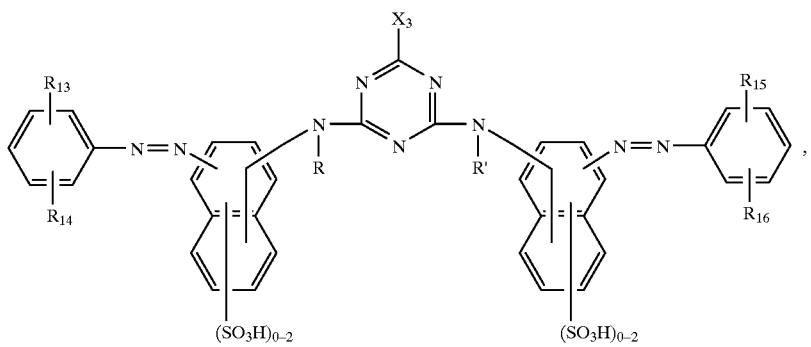

(5)

wherein R and R' are each independently of the other hydrogen or unsubstituted or substituted $C_1$–$C_4$alkyl, $X_2$ and $X_3$ are halogen, and $R_9$, $R_{10}$, $R_{11}$, $R_{12}$, $R_{13}$, $R_{14}$, $R_{15}$ and $R_{16}$ are each independently of one another hydrogen, $C_1$–$C_4$alkyl, $C_1$–$C_4$alkoxy, ureido, halogen, sulfo, or $C_2$–$C_4$alkanoylamino or $C_1$–$C_4$alkoxycarbonyl-amino which may be substituted in the alkyl moiety.

By the trichromatic technique is meant the additive dye blending of suitably chosen yellow-, orange-, red- and blue-dyeing dyes with which any desired shade of the visible colour spectrum may be achieved by the appropriate choice of the quantity ratios of the dyes.

R, R', $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$ and $R_{16}$ defined as $C_1$–$C_4$alkyl may suitably be methyl, ethyl, propyl, isopropyl, butyl, isobutyl, sec-butyl or tert-butyl. Methyl or ethyl are preferred, and methyl is particularly preferred. R and R' defined as $C_1$–$C_4$alkyl may be unsubstituted or substituted by e.g. hydroxy, $C_1$–$C_4$alkoxy, halogen or sulfato. R and R' are preferably unsubstituted.

$R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$ and $R_{16}$ defined as $C_1$–$C_4$alkoxy may suitably be methoxy, ethoxy, propoxy, isopropoxy, butoxy, sec-butoxy, isobutoxy or tert-butoxy, preferably methoxy.

$R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$ and $R_{16}$ defined as $C_2$–$C_4$alkanoylamino may suitably be propionylamino or, preferably, acetylamino. $R_9$, $R_{10}$, $R_{11}$, $R_{12}$, $R_{13}$, $R_{14}$, $R_{15}$ and $R_{16}$ defined as $C_2$–$C_4$alkanoylamino may be unsubstituted or, for example, substituted in the alkyl moiety by $C_1$–$C_4$alkoxy or hydroxy.

$R_9$, $R_{10}$, $R_{11}$, $R_{12}$, $R_{13}$, $R_{14}$, $R_{15}$ and $R_{16}$ defined as $C_1$–$C_4$alkoxycarbonylamino are preferably methoxycarbonylamino or ethoxycarbonylamino. $R_9$, $R_{10}$, $R_{11}$, $R_{12}$, $R_{13}$, $R_{14}$, $R_{15}$ and $R_{16}$ defined as $C_1$–$C_4$alkoxycarbonylamino may be unsubstituted or, for example, substituted in the alkyl moiety by $C_1$–$C_4$alkoxy or hydroxy.

$R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$ and $R_{16}$ defined as halogen are typically fluoro or bromo and, preferably, chloro.

$X_1$, $X_2$ and $X_3$ are preferably fluoro or chloro. Chloro is preferred.

R and R' are preferably independently of the other hydrogen or $C_1$–$C_4$alkyl. Hydrogen is preferred.

$R_1$, $R_2$, $R_3$ and $R_4$ are preferably independently of one another hydrogen, $C_1$–$C_4$alkyl, $C_1$–$C_4$alkoxy, $C_2$–$C_4$alkanoylamino, ureido or halogen, in particular hydrogen.

$R_5$, $R_6$, $R_7$ and $R_8$ are preferably independently of one another hydrogen, $C_1$–$C_4$alkyl, $C_1$–$C_4$alkoxy, $C_2$–$C_4$alkanoylamino, ureido or halogen, in particular hydrogen.

$R_9$, $R_{10}$, $R_{11}$, $R_{12}$, $R_{13}$, $R_{14}$, $R_{15}$ and $R_{16}$ are preferably independently of one another hydrogen, $C_1$–$C_4$alkyl, $C_1$–$C_4$alkoxy, ureido, halogen, or $C_2$–$C_4$alkanoylamino or $C_1$–$C_4$alkoxycarbonylamino which may be substituted in the alkyl moiety by $C_1$–$C_4$alkoxy or hydroxy.

The blue-dyeing dye preferably consists of at least one dye of formula

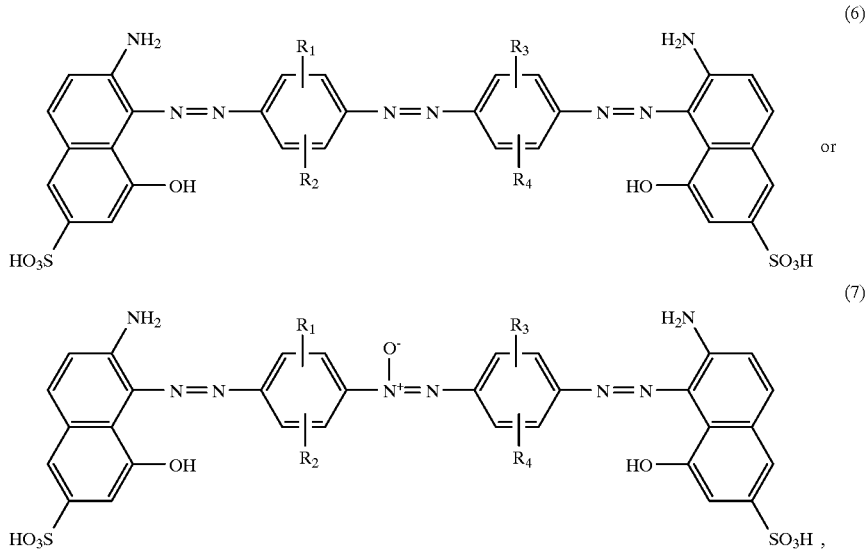

wherein $R_1$, $R_2$, $R_3$ and $R_4$ have the meanings and preferred meanings cited above, $R_1$, $R_2$, $R_3$ and $R_4$ preferably being hydrogen.

The blue-dyeing dye particularly preferably consists of at least one dye of formula (1), more preferably of at least one dye of formula (6).

Interesting blue-dyeing dyes are also mixtures consisting of the dyes of formulae (1) and (2), preferably mixtures consisting of the dyes of formulae (6) and (7). The dye of formula (1) is preferably used in an amount from 5 to 95% by weight, more preferably from 10 to 90% by weight and, particularly preferably, from 20 to 80% by weight, based on the total amount of the dyes of formulae (1) and (2). The dye of formula (1) is particularly preferably used in an amount from 40 to 60% by weight.

The red-dyeing dye preferably consists of at least one dye of formula wherein R, R', $R_5$, $R_6$, $R_7$, $R_8$ and $X_1$ have the meanings and preferred meanings cited above.

The red-dyeing dye are particularly preferably those of formula (3), in particular those of formula (8), wherein R and R' are each independently of the other hydrogen or $C_1$–$C_4$alkyl, preferably hydrogen, $R_5$, $R_6$, $R_7$ and $R_8$ are each independently of one another hydrogen, $C_1$–$C_4$alkyl, $C_1$–$C_4$alkoxy, $C_2$–$C_4$alkanoylamino, ureido or halogen, preferably hydrogen, and $X_1$ is fluoro or, preferably, chloro.

The red-dyeing dye is very particularly preferably that of formula

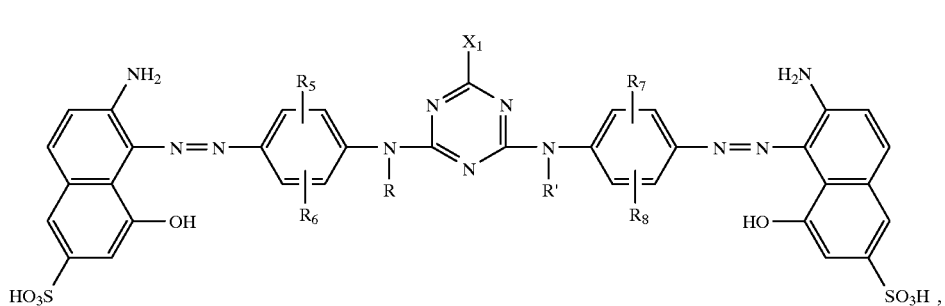

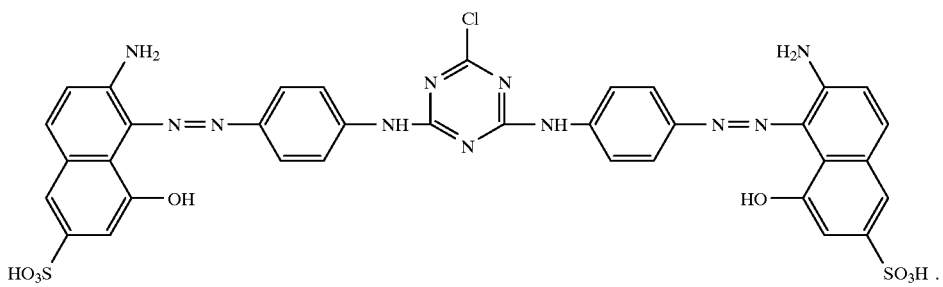

(9)

The naphthalene rings of the yellow- or orange-dyeing dyes of formulae (4) and (5) preferably contain only one or two sulfo groups each, more preferably only one sulfo group each. The total number of sulfo groups of the dyes of formulae (4) and (5) is preferably 2 to 4 each, more preferably two.

Preferred yellow- or orange-dyeing dyes of formula (4) are those of formula

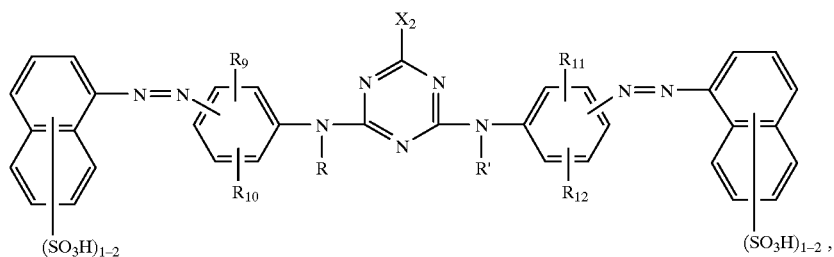

(10)

wherein R, R', $R_9$, $R_{10}$, $R_{11}$, $R_{12}$ and $X_2$ have the meanings and preferred meanings cited above.

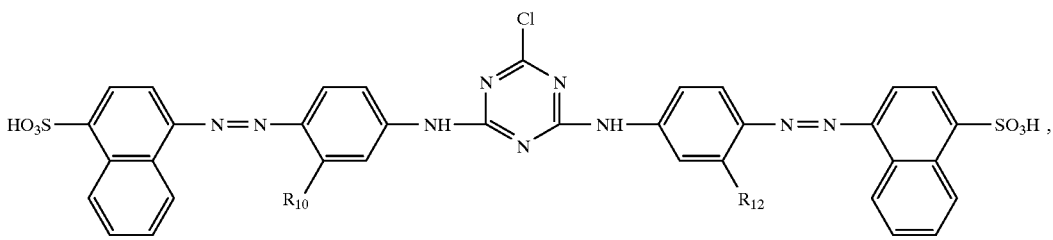

(11)

Particularly preferred yellow- or orange-dyeing dyes of formula (4), and particularly preferred dyes of formula (10), are those, wherein R and R' are each independently of the other hydrogen or $C_1$–$C_4$alkyl, preferably hydrogen, $R_9$, $R_{10}$, $R_{11}$ and $R_{12}$ are each independently of one another hydrogen, $C_1$–$C_4$alkyl, $C_1$–$C_4$alkoxy, ureido, halogen, or $C_2$–$C_4$alkanoylamino or $C_1$–$C_4$alkoxycarbonylamino which may be substituted in the alkyl moiety by $C_1$–$C_4$alkoxy or hydroxy, $R_9$ and $R_{11}$ preferably being hydrogen, $X_2$ is fluoro or, preferably, chloro, the naphthalene rings of the dyes of formula (4) or of formula (10) each containing only one or two sulfo groups, preferably only one sulfo group.

Very particularly preferred yellow- or orange-dyeing dyes of formula (4) are those of formula wherein $R_{10}$ and $R_{12}$ have the meanings and preferred meanings cited above. $R_{10}$ and $R_{12}$ are preferably hydrogen, $C_1$–$C_4$alkyl, $C_1$–$C_4$alkoxy, ureido, halogen, or $C_2$–$C_4$alkanoylamino or $C_1$–$C_4$alkoxycarbonylamino which may be substituted in the alkyl moiety by $C_1$–$C_4$alkoxy or hydroxy; more preferably $C_1$–$C_4$alkyl, $C_1$–$C_4$alkoxy, ureido, halogen, or $C_2$–$C_4$alkanoylamino or $C_1$–$C_4$alkoxycarbonylamino which may be substituted in the alkyl moiety by $C_1$–$C_4$alkoxy or hydroxy and, most preferably, ureido.

Preferred yellow- or orange-dyeing dyes of formula (5) are those of formula (12)

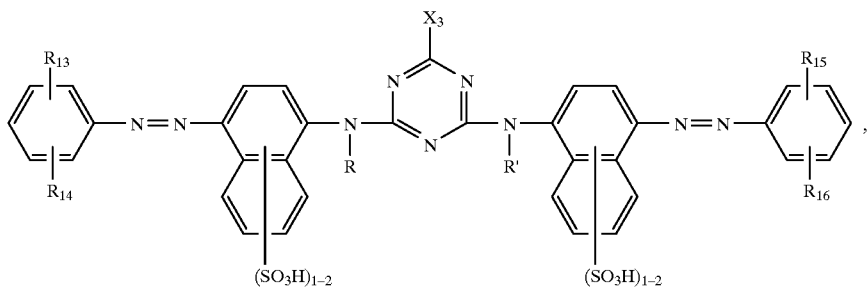

wherein R, R', $R_{13}$, $R_{14}$, $R_{15}$, $R_{16}$ and $X_3$ have the meanings and preferred meanings cited above.

Particularly preferred yellow- or orange-dyeing dyes of formula (5), and particularly preferred dyes of formula (12), are those, wherein R and R' are each independently of the other hydrogen or $C_1$–$C_4$alkyl, preferably hydrogen, $R_{13}$, $R_{14}$, $R_{15}$ and $R_{16}$ are each independently of one another hydrogen, $C_1$–$C_4$alkyl, $C_1$–$C_4$alkoxy, ureido, halogen, or $C_2$–$C_4$alkanoylamino or $C_1$–$C_4$alkoxycarbonylamino which may be substituted in the alkyl moiety by $C_1$–$C_4$alkoxy or hydroxy, $R_{13}$ and $R_{15}$ preferably being hydrogen, $X_3$ if fluoro or, preferably, chloro, the naphthalene rings of the dyes of formula (5) or of formula (12) each containing only one or two sulfo groups, preferably only one sulfo group.

Particularly interesting yellow- or orange-dyeing dyes are those of formula (4), preferably those of formula (10) and, more preferably, those of formula (11). Very particularly interesting yellow- or orange-dyeing dyes are those of formula (11), wherein $R_{10}$ and $R_{12}$ are ureido.

A preferred embodiment of the process of this invention is that which comprises using at least one red-dyeing dye of formula (8) together with at least one yellow- or orange-dyeing dye of formula (4), in particular of formula (10) and, preferably, of formula (11). The blue-dyeing dyes of formulae (1) and (2) have the meanings and preferred meanings cited above. The blue-dyeing dyes preferably consist of at least one dye of formulae (6) and (7), $R_1$, $R_2$, $R_3$ and $R_4$ preferably being hydrogen.

A particularly preferred embodiment of the process of this invention is that which comprises using a red-dyeing dye of formula (9) together with at least one yellow- or orange-dyeing dye of formula (4), in particular of formula (10) and, preferably, of formula (11). The blue-dyeing dyes of formulae (1) and (2) have the meanings and preferred meanings cited above. The blue-dyeing dyes preferably consist of at least one dye of formulae (6) and (7), $R_1$, $R_2$, $R_3$ and $R_4$ preferably being hydrogen.

A very particularly preferred embodiment of the process of this invention is that which comprises using a red-dyeing dye of formula (9) together with a yellow- or orange-dyeing dye of formula (11), wherein $R_{10}$ and $R_{12}$ are ureido. The blue-dyeing dyes of formulae (1) and (2) have the meanings and preferred meanings cited above. The blue-dyeing dyes preferably consist of at least one dye of formulae (6) and (7), $R_1$, $R_2$, $R_3$ and $R_4$ preferably being hydrogen. The dye of formula (6) is of very particular interest.

Another interesting embodiment of the novel process relates to the preparation of black shades. In this case the dyes of formulae (1) and/or (2) are conveniently used in an amount from 30 to 70% by weight, preferably from 40 to 60% by weight; the dyes of formula (3) are conveniently used in an amount from 3 to 20% by weight, preferably from 5 to 15% by weight, and the dyes of formulae (4) and/or (5) are conveniently used in an amount from 30 to 50% by weight, preferably from 35 to 45% by weight. These amounts are all based on the total amount of the dyes of formulae (1) to (5). Accordingly, the sum of the amounts of the dyes of formulae (1) to (5) employed is 100% by weight.

The invention also relates to dye mixtures, comprising a mixture of at least one blue-dyeing dye of formula (1) or (2), together with at least one red-dyeing dye of formula (3), and together with at least one yellow- or orange-dyeing dye of formula (4) or (5). The dyes of formulae (1), (2), (3), (4) and (5) and the mixtures thereof have the meanings and preferred meanings cited above.

The dyes of formulae (1), (2), (3), (4) and (5) are known or can be prepared in general analogy to known dyes. The dyes of formulae (1) and (2), for example, can be obtained according to the instructions of U.S. Pat. No. 4,009,156 and U.S. Pat. No. 4,591,634.

The dyes of formula (3) can, for example, be obtained by condensing cyanuric halide with the amines of formulae

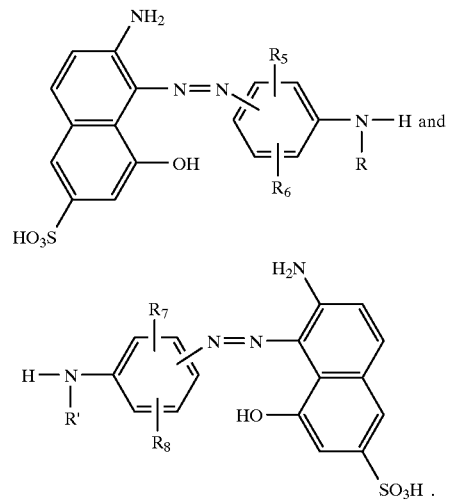

The dyes of formula (4) can, for example, be obtained by condensing cyanuric halide with the amines of formulae

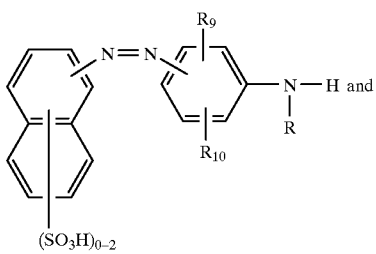

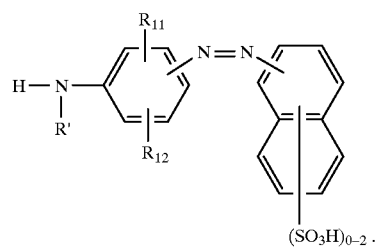

The dyes of formula (5) can, for example, be obtained by condensing cyanuric halide with the amines of formulae

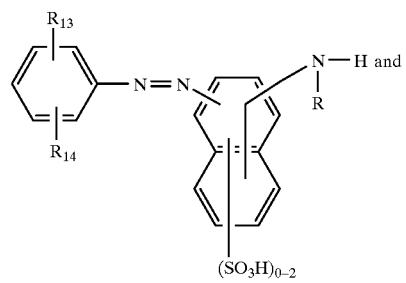

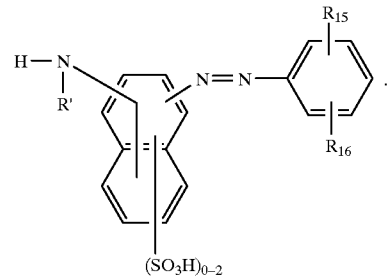

The cyanuric halide is preferably first reacted with about stoichiometric amounts of one of the two aminoazo compounds at a temperature of −5 to 20° C., the pH being kept in the range from neutral to slightly acid, preferably from 5 to 7, by the addition of suitable bases, typically alkali metal bases such as lithium hydroxide, sodium hydroxide or potassium hydroxide, or lithium carbonate, sodium carbonate or potassium carbonate. The triazine derivative so obtained can be separated off, or the reaction mixture can be used direct for a further reaction. Conveniently about stoichiometric amounts of the other of the two aminoazo compounds are added to the reaction mixture so obtained, or to the triazine derivative previously separated off, and are reacted with the triazine derivative at slightly elevated temperature, preferably from 30 to 50° C., and at a neutral to slightly acid pH of preferably 6 to 7. If the two aminoazo compounds are identical, about 2 equivalents of this aminoazo dye are reacted with 1 equivalent of cyanuric halide, the temperature preferably being at first kept at −5 to 20° C. and then raised to about 30 to 50° C.

The aminoazo compounds are known or can be prepared in general analogy to known compounds. These azo compounds can, for example, be obtained by customary diazotisation and coupling reactions.

Diazotisation is usually effected with a nitrite, e.g. an alkali metal nitrite such as sodium nitrite, and in a medium containing mineral acid, conveniently hydrochloric acid, in the temperature range from e.g. −5 to 30° C. and, preferably, from 0 to 10° C.

Coupling is usually carried out in the acid, neutral or weakly alkaline pH range and in the temperature range from e.g. −5 to 30° C., preferably from 0 to 25° C.

The dyes employed in the novel process for trichromatic dyeing or printing are either in the form of their free sulfonic acids or, preferably, in the from of their salts.

Examples of suitable salts are the alkali metal salts, alkaline earth metal salts or ammonium salts, or the salts of an organic amine. Typical examples are the sodium, lithium, potassium or ammonium salts or the salt of mono-, di- or triethanolamine.

The dyes employed in the process of this invention may contain further auxiliaries, such as sodium chloride or dextrin.

The trichromatic dyeing or printing process of this invention may be applied in conventional dyeing or printing methods. In addition to containing water and the dyes, the dye liquors or printing pastes may contain further auxiliaries, for example wetting agents, antifoams, levelling agents or agents which influence the property of the textile materials, e.g. softeners, flameproofing additives, or dirt, water and oil repellents, as well as water softeners and natural or synthetic thickeners, e.g. alginates and cellulose ethers.

The novel process for trichromatic dyeing or printing is also suitable for dyeing from short liquors, e.g. in continuous dyeing or in batchwise or continuous foam dyeing processes.

The amounts of the individual dyes employed in the dye liquors or printing pastes may vary within wide limits depending on the desired tinctorial strenght. Convenient amounts have been found to be usually those from 0.01 to 15% by weight, preferably from 0.1 to 10% by weight, based on the goods to be dyed or on the printing paste.

Dyeing is preferably carried out by the exhaust process.

The goods are preferably dyed at a pH from 3 to 7, more preferably from 3 to 5. The liquor ratio may be chosen from a wide range, typically from 1:5 to 1:50, preferably from 1:5 to 1:30. Dyeing is preferably carried out in the temperature range from 70 to 110° C., more preferably from 80 to 105° C.

In trichromatic dyeing or printing, the dyes employed in the process of this invention are distinguished by level colour build-up, good exhaustion properties, good consistency of shade even at different concentrations, good fastness properties and solubility and, in particular, by very good compatibility.

The novel process for trichromatic dyeing or printing is suitable for dyeing or printing natural polyamide materials, e.g. wool, and also, in particular, synthetic polyamide materials, e.g. polyamide 6 or polyamide 66, and is suitable for dyeing or printing wool and synthetic polamide blends and yarns.

The textile material may be in any form of presentation, e.g. in the form of fibre, yarn, wovens, knits or carpets.

The dyeings obtained are level and have good allround fastness properties, in particular good fastness to rubbing, wet rubbing and light.

In the following Examples, parts are by weight and temperatures are given in degrees Celsius. The relationship between parts by weight and parts by volume is the same as that between the gram and the cubic centimetre.

EXAMPLE 1

200 parts of demineralised water are adjusted to a pH of 3.5 with acetic acid at room temperature. To this bath is then added a mixture of 1 part of a dye which, in the form of the free acid, corresponds to the compound of formula

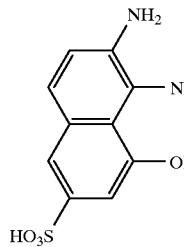 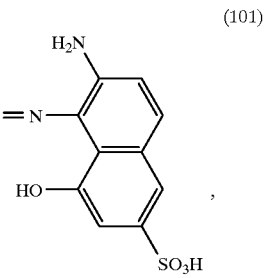

(101)

0.19 part of a dye which, in the form of the free acid, corresponds to the compound of formula

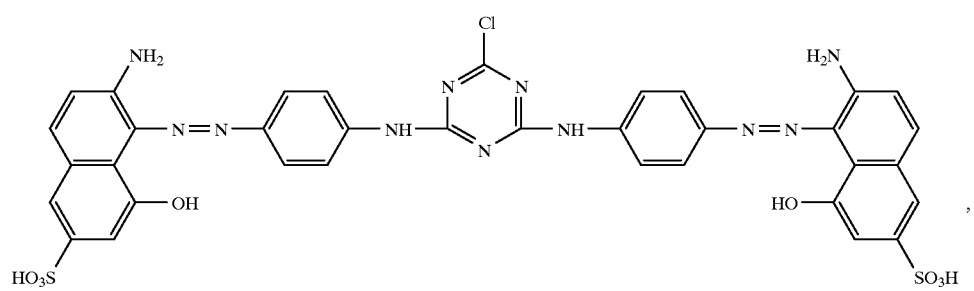

(102)

and 0.8 part of a dye which, in the form of the free acid, corresponds to the compound of formula

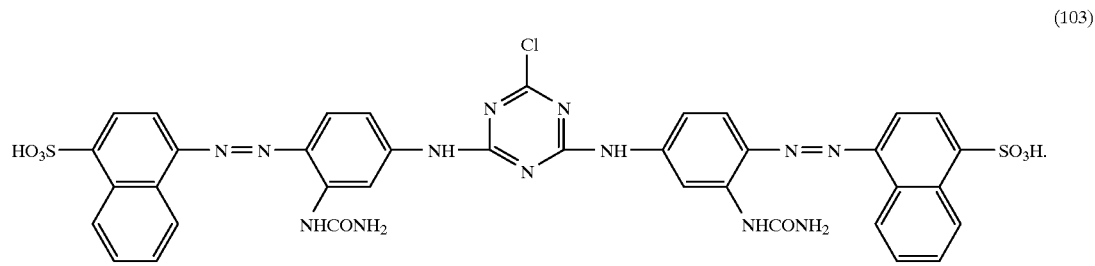

(103)

10 parts of polyamide 66 fibre material (Helanca tricot) are put into the resultant dye solution and the dyebath is heated over 45 minutes to about 100° C. The dyebath is kept at this temperature for 60 minutes and then cooled to 70° C. The dyed goods are removed from the dyebath, rinsed with water and then dried, giving a fabric dyed in a black shade.

What is claimed is:

1. A process for dyeing or printing natural or synthetic polyamide fibre material by the trichromatic technique, which comprises using at least one blue-dyeing dye of formula (1)

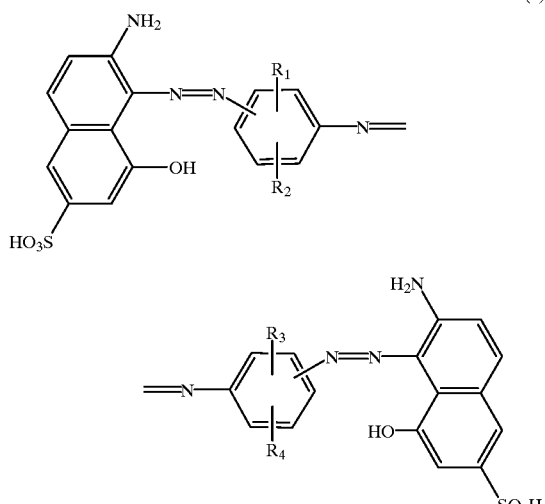

(1)

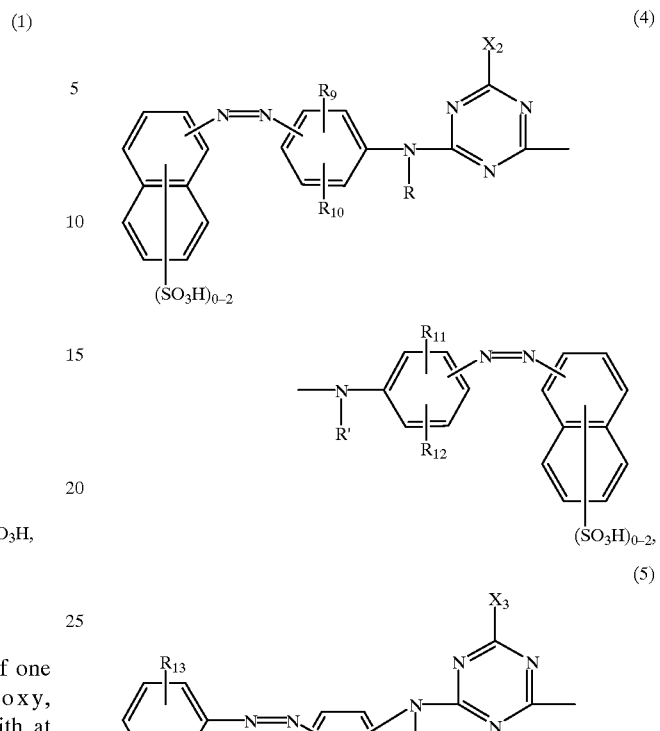

(4)

wherein $R_1$, $R_2$, $R_3$ and $R_4$ are each independently of one another hydrogen, $C_1$–$C_4$alkyl, $C_1$–$C_4$alkoxy, $C_2$–$C_4$alkanoylamino, ureido or halogen, together with at least one red-dyeing dye of formula (3)

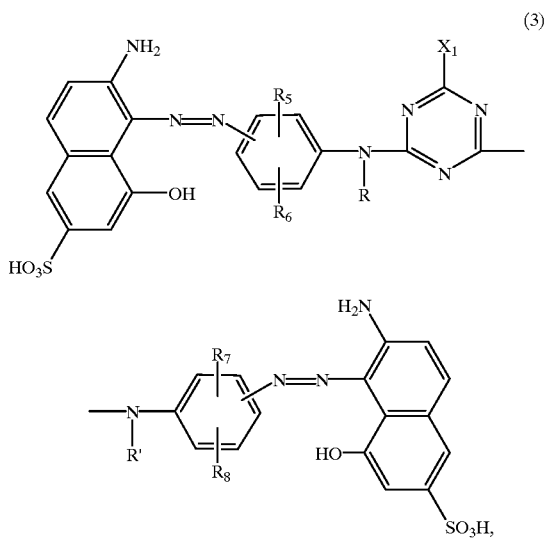

(3)

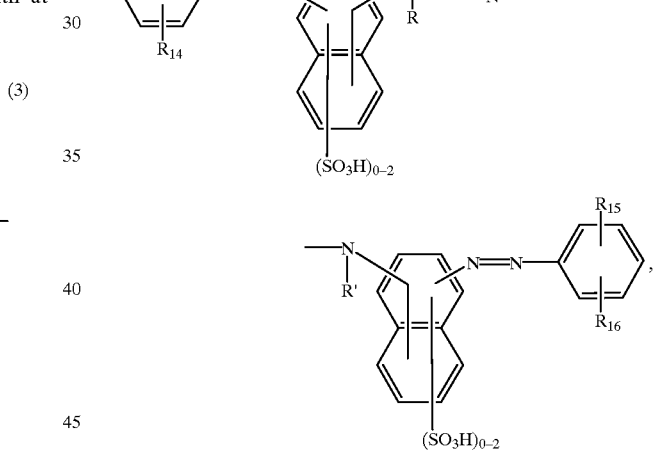

(5)

wherein R and R' are each independently of the other hydrogen or $C_1$–$C_4$alkyl which is unsubstituted or substituted by hydroxy, $C_1$–$C_4$alkoxy, halogen or sulfato, $R_5$, $R_6$, $R_7$ and $R_8$ are each independently of one another hydrogen, $C_1$–$C_4$alkyl, $C_1$–$C_4$alkoxy, $C_2$–$C_4$alkanoylamino, ureido or halogen, and $X_1$ is halogen, and together with at least one yellow- or orange-dyeing dye of formula (4) or (5)

wherein R and R' are each independently of the other hydrogen or $C_1$–$C_4$alkyl which is unsubstituted or substituted by hydroxy, $C_1$–$C_4$alkoxy, halogen or sulfato, $X_2$ and $X_3$ are halogen, and $R_9$, $R_{10}$, $R_{11}$, $R_{12}$, $R_{13}$, $R_{14}$, $R_{15}$ and $R_{16}$ are each independently of one another hydrogen, $C_1$–$C_4$alkyl, $C_1$–$C_4$alkoxy, uriedo, halogen or $C_2$–$C_4$alkanoylamino or $C_1$–$C_4$alkoxycarbonylamino which may be substituted in the alkyl moiety by $C_1$–$C_4$alkoxy or hydroxy.

2. A process according to claim 1, which comprises using as blue-dyeing dye at least one dye of formula

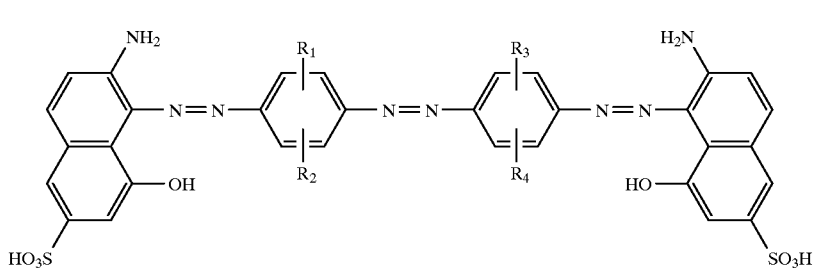
(6)

wherein $R_1$, $R_2$, $R_3$ and $R_4$ have the meanings claimed in claim 1.

3. A process according to claim 1, wherein $R_1$, $R_2$, $R_3$ and $R_4$ are hydrogen.

4. A process according to claim 1, which comprises using as red-dyeing dye at least one dye of formula

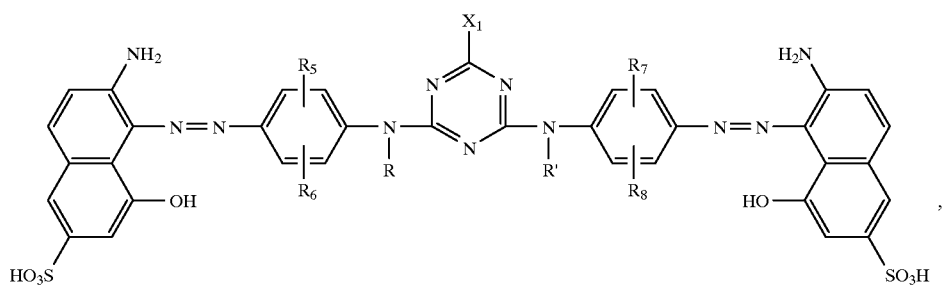
(8)

wherein R, R', $R_5$, $R_6$, $R_7$, $R_8$ and $X_1$ have the meanings claimed in claim 1.

5. A process according to claim 1, which comprises dyeing or printing wool or synthetic polyamide fibre material.

6. A process according to claim 1, wherein $R_5$, $R_6$, $R_7$ and $R_8$ are hydrogen.

7. A process according to claim 1, which comprises using as yellow- or orange-dyeing dye at least one dye of formula wherein R, R', $R_9$, $R_{10}$, $R_{11}$, $R_{12}$ and $X_2$ have the meanings claimed in claim 1.

8. A process according to claim 5, which comprises dyeing or printing synthetic polyamide fibre material.

9. A process according to claim 1, wherein R and R' are hydrogen.

10. A process according to claim 1, wherein $X_1$, $X_2$ and $X_3$ are chloro.

11. A process according to claim 1, which comprises using as red-dyeing dye a dye of formula

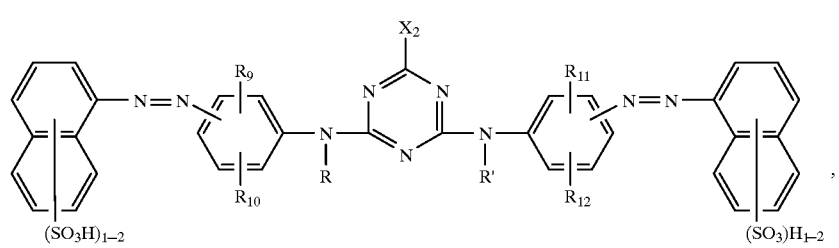
(10)

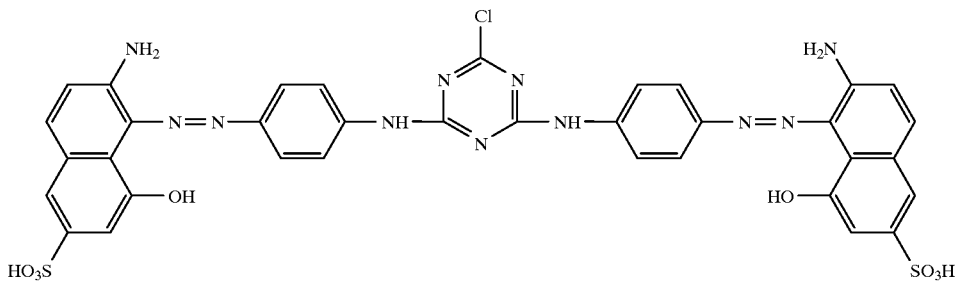

(9)

and as yellow- or orange-dyeing dye at least one dye of formula $C_2$–$C_4$alkanoylamino, ureido or halogen, together with at least one red-dyeing dye of formula (3)

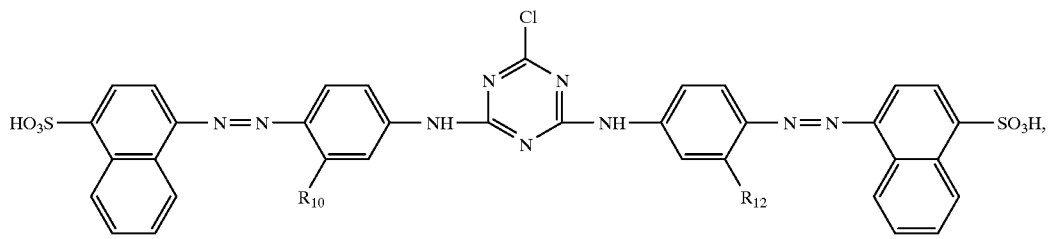

(11)

wherein $R_{10}$ and $R_{12}$ are each independently of the other hydrogen, $C_1$–$C_4$alkyl, $C_1$–$C_4$alkoxy, ureido, halogen, or $C_2$–$C_4$alkanoylamino or $C_1$–$C_4$alkoxycarbonylamino which may be substituted in the alkyl moiety by $C_1$–$C_4$alkoxy or hydroxy.

12. A process according to claim 11, wherein $R_{10}$ and $R_{12}$ are ureido.

13. A dye mixture, comprising at least one blue-dyeing dye of formula (1)

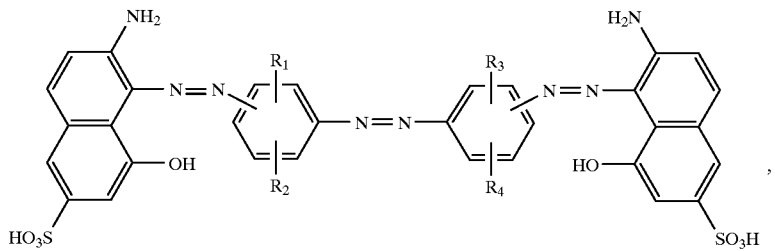

(1)

wherein $R_1$, $R_2$, $R_3$ and $R_4$ are each independently of one another hydrogen, $C_1$–$C_4$alkyl, $C_1$–$C_4$alkoxy,

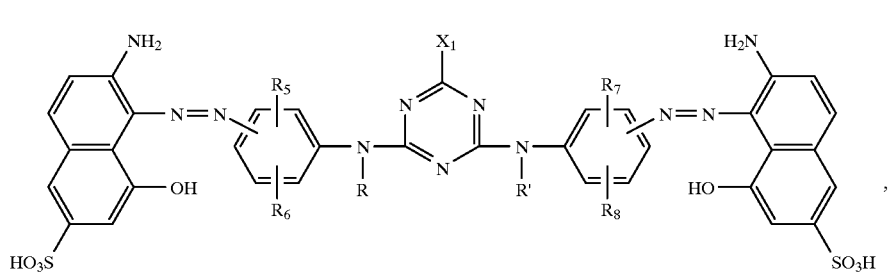

(3)

wherein R and R' are each independently of the other hydrogen or $C_1$–$C_4$alkyl which is unsubstituted or substituted by hydroxy, $C_1$–$C_4$alkoxy, halogen or sulfato, $R_5$, $R_6$, $R_7$ and $R_8$ are each independently of one another hydrogen, $C_1$–$C_4$alkyl, $C_1$–$C_4$alkoxy, $C_2$–$C_4$alkanoylamino, ureido or halogen, and $X_1$ is halogen, and together with at least one yellow- or orange-dyeing dye of formula (4) or (5)

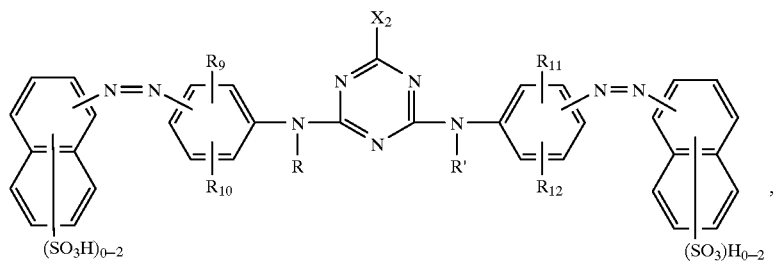

(4)

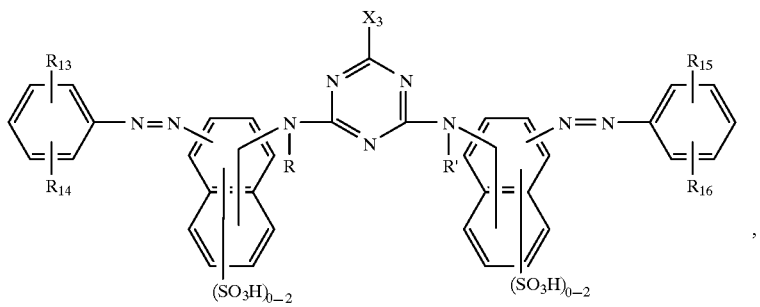

(5)

wherein R and R' are each independently of the other hydrogen or $C_1$–$C_4$alkyl which is unsubstituted or substituted by hydroxy, $C_1$–$C_4$alkoxy, halogen or sulfato, $X_2$ and $X_3$ are halogen, and $R_9$, $R_{10}$, $R_{11}$, $R_{12}$, $R_{13}$, $R_{14}$, $R_{15}$ and $R_{16}$ are each independently of one another hydrogen, $C_1$–$C_4$alkyl, $C_1$–$C_4$alkoxy, ureido, halogen or $C_2$–$C_4$alkanoylamino or $C_1$–$C_4$alkoxycarbonylamino which may be substituted in the alkyl moiety by $C_1$–$C_4$alkoxy or hydroxy.

* * * * *